United States Patent
Schmitt et al.

(10) Patent No.: US 6,282,227 B1
(45) Date of Patent: Aug. 28, 2001

(54) DIODE-PUMPED DOUBLE FREQUENCY SOLID-STATE LASER

(75) Inventors: Nikolaus Schmitt, Munich; Guenter Toesko, Kronach; Guenter Reithmeier, Putzbrunn; Josef Schalk, Altheim, all of (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 09/297,834
(22) PCT Filed: Nov. 7, 1997
(86) PCT No.: PCT/EP97/06206
 § 371 Date: Sep. 21, 1999
 § 102(e) Date: Sep. 21, 1999
(87) PCT Pub. No.: WO98/21787
 PCT Pub. Date: May 22, 1998

(30) Foreign Application Priority Data

Nov. 8, 1996 (DE) .............................................. 196 46 072

(51) Int. Cl.[7] ..................................................... H01S 3/08
(52) U.S. Cl. ............................................. 372/107; 372/69
(58) Field of Search ................................. 372/107, 92, 98, 372/99, 105; 361/600–837; 206/701–728

(56) References Cited

U.S. PATENT DOCUMENTS

| 4,665,529 | 5/1987 | Baer et al. . |
| 4,977,566 | 12/1990 | Herbst et al. . |
| 5,130,996 | 7/1992 | Amano et al. . |
| 5,446,750 | 8/1995 | Ohtsuka et al. . |
| 5,506,854 | 4/1996 | Basu . |

FOREIGN PATENT DOCUMENTS

| 0 251 718 | 1/1988 | (EP) . |
| 0 508 406 | 10/1992 | (EP) . |
| 0 651 475 | 5/1995 | (EP) . |
| 8-236848 | 9/1996 | (JP) . |

*Primary Examiner*—Teresa M. Arroyo
*Assistant Examiner*—Davienne Monbleau
(74) *Attorney, Agent, or Firm*—Crowell & Moring, L.L.P.

(57) ABSTRACT

In a diode-pumped frequency-doubled solid-state laser, all the elements of the resonator as well as the elements inside the resonator such as the laser crystal, mirror, and frequency doubler, are accommodated in or on an angle or U profile, which is milled as a solid part from a solid piece or is manufactured as a cast, stamped, or sintered part from metal or ceramic. The profile has one or more intermediate walls that are made of the same piece, as the angle or U profile to lend additional stability. The elements of the resonator or elements inside the resonator are contained on or in the resonator, and the intermediate walls have openings to allow the laser mode and/or the laser irradiation to pass through.

26 Claims, 3 Drawing Sheets

DIODE-PUMPED DOUBLE FREQUENCY SOLID-STATE LASER

The invention relates to a diode-pumped, frequency-doubled solid-state laser according to the preamble of Claim 1.

Solid-state lasers, usually built using rare-earth-doped crystals or glasses, for example Nd:YAG, Nd:YVO$_4$, Nd:YAlO, ND:YLF, Nd:glass or other similar solid materials and equipped with resonator-internal frequency doubling, have been known for a long time and are used in many applications in laser technology. Generation of second or higher harmonic oscillations is used in materials, primarily crystals, which have no inversion centers—for example KTP, LBO, BBO, KNbO$_3$, LiNbO$_3$ or others—with a high nonlinear coefficient, which generates light at twice or four times the frequency of the radiant energy received, by inharmonic oscillations of the lattice atoms, excited by an incident light wave. The process of generating higher harmonics is highly dependent upon the power density (see for example Köchner, Solid-State Laser Engineering) so that to produce frequency-doubled laser radiation with higher efficiency, the non-linear crystal is usually, at least in continuously operating (cw) lasers, accommodated in the resonator of the laser itself (see above or also for example Yariv, Quantum Electronics, third edition, Page 402). The resonator mirrors are usually chosen to be highly reflecting for the laser wavelength in order to achieve a maximum magnification in the resonator and hence a doubling efficiency that is as high as possible. The decoupling mirror is simultaneously highly transmitting for the frequency-doubled radiation in order to be able to decouple the latter readily from the resonator.

Usually such lasers are built on optical benches, in other words the elements for holding the laser crystal, frequency doubler, and decoupling mirror are usually screwed tight on the underside to a plate or lined up along a rail by means of displaceable structures. This design however, in cases of resonator-internal frequency doubling in which an especially slight adjustment tolerance is necessary because of the power-density-dependent conversion efficiency, is not sufficiently stable in the long term when exposed to changing environmental conditions or over a long operating life. In particular, bending of the optical bench or rail as well as tilting of the retaining elements that are fastened on only one side are responsible for this.

One known alternative design provides for mounting the retaining elements on three or for steel rods which are typically inserted through matching openings in the corners of the (usually rectangular) retaining elements, with the retaining and adjusting elements being secured by clamps to the rods. Although no significant tilting of the retaining elements with respect to one another can occur, practice shows that when the retaining elements are clamped to the rods, stresses are exerted on the rods which likewise lead to the elements going out of adjustment in the long term. In addition, good heat transfer from the holders is not possible, with the holders being subjected to heat for example from the laser crystal or the frequency doubler, since the rods have a small cross section and therefore a poor conductivity, as well as no possible contact with a larger thermal mass serving as the cooling body.

Yet another solution according to the prior art is provided by mounting the resonator elements either in threaded sleeves, with no independent retaining structure being formed and with the stability of an element depending on the stability of the mounting elements, or in tubes, which allows the resonator to be manufactured only in a certain sequence and not permitting subsequent removal of a central resonator element.

Finally, retaining and adjusting elements can be clamped displaceably on a (thicker) tube instead of a plate, which has the same disadvantages as the optical bench as far as tilting and heat removal are concerned.

Therefore the goal of the invention is to provide a resonator structure which is free of stress, has no internal twisting or tensioning by the retaining or adjusting elements, exhibits good heat transfer and the properties of a cooling body, as well as a large contact surface to receive retaining elements subject to thermal stress.

This is achieved by the features listed in the characterizing clause of Claim 1. Details of the invention will be found in the subclaims and the specification, in which several embodiments are explained with reference to the drawing.

The solution according to the invention provides a design which consists of an angle or U profile which is either milled from a single piece of low-stress material, for example low-stress aluminum, by milling for example or is produced as a cast part free of stress in one piece. This angle or U profile also contains at least one, but preferably at least two, intermediate walls that are made from the same piece and therefore provide the angle with additional stability against twisting and tension. Such an arrangement, always relative to the case of an angle, is shown in the following FIGS. 1 to 5.

Figure 2:
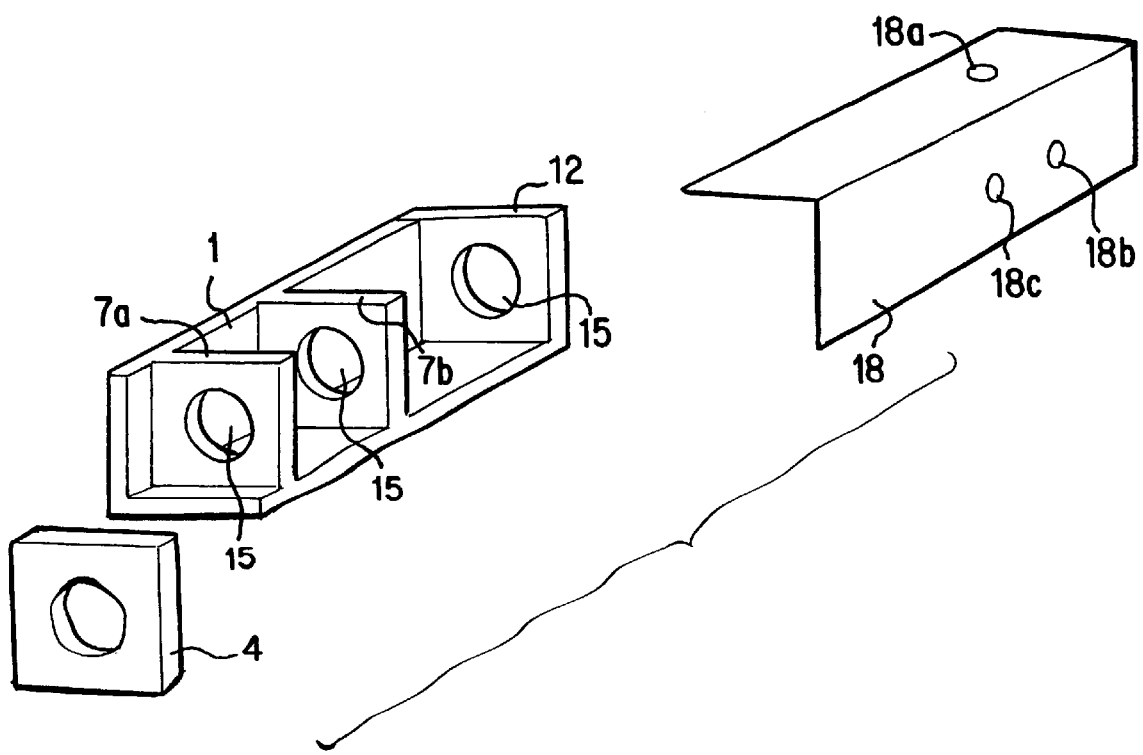
FIG. 2 is a perspective view of the resonator structure according to the invention without the resonator elements.

FIG. 2 for example shows the angle (1) with intermediate walls (7a) and (7b) that are machined from one piece. Intermediate walls (7a) and (7b) have openings that permit unimpeded propagation of the resonator mode or the laser radiation along the axis of the angle. On the front and back, closing off the angle, either walls likewise made of the same piece or, as in the drawing, bolted plates (4) and (12) can be provided that lend the angle additional stability.

Flush retaining and adjusting elements can then be mounted on these retaining plates and intermediate walls, for example by bolting. As a result, maximum stability of these elements with respect to one another is guaranteed as well as a good removal of heat from any heat sources as a result of flush contact with the intermediate wall. In this fashion, the angle simultaneously serves as a thermal mass and a cooling body, with the coolable thermal load being limited in particular by the resultant length expansion and possible lack of adjustment of the elements, which however is minimized in this arrangement.

Figure 1:
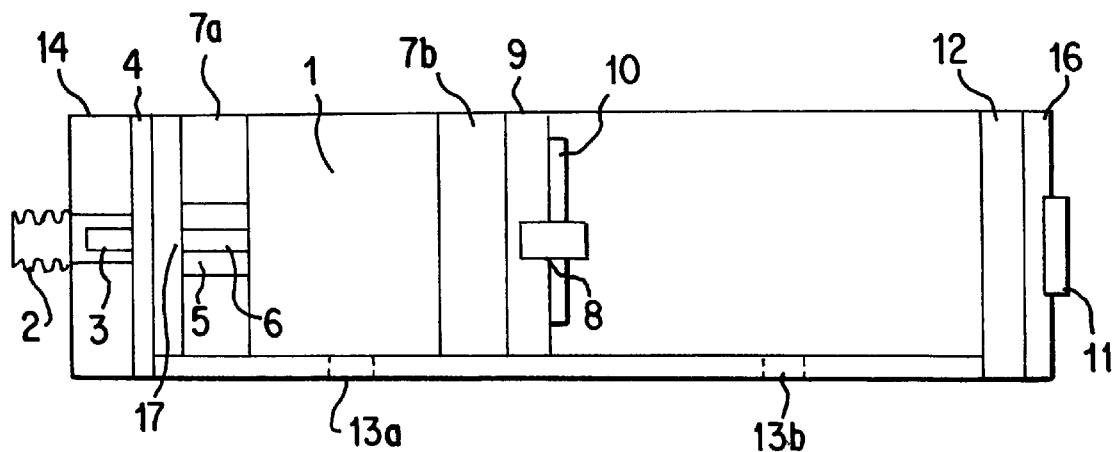
FIG. 1 is a sketch of the arrangement according to the invention of a resonator structure with the resonator elements mounted.

This mounting of a resonator element is shown clearly in FIG. 1. A laser crystal (6) is mounted in the first intermediate wall (7), said crystal being held in a bushing (5). The material of this bushing is chosen so that the temperature of the laser crystal is optimum and so that as a result of the induced thermal lens, the resonator mode is focused at the location of the frequency-doubling crystal (8) and therefore results in an increased power density, from which a higher frequency conversion follows. Frequency doubler (8) in turn is received in a holding and adjusting device 9 that permits adjustment perpendicularly to the radiation direction (this is an axis that passes through all optical elements (6), (8), and (11) in two directions as well as tilting in two directions perpendicularly to the beam axis as well as rotation around the beam axis. In this manner, both the phase adjustment angle and the polarization direction and the optical perpendicular position of the pistol can take place. The frequency doubler can also be heated or cooled by a Peltier element 10, with the heat from the Peltier element being transmitted for example to the retaining and adjusting device 9 and the intermediate wall (7b); alternative possibilities for heat transport are also possible of course.

At the right-hand end of the angle in FIG. 2 is a bolted plate 12 which can also be made as the end wall of an angular body manufactured from one piece like walls (7a) and (7b). A retaining and adjusting device 16 is mounted on this wall, said device supporting laser mirror 11 and permitting the latter to tilt as well as to shift perpendicularly with respect to the beam axis in two directions. At the left end of the angle, a plate (4) is likewise mounted, said plate likewise possibly being a fixed wall of the angle on which a lens (3) for focusing the pumped light radiation is mounted by a retaining and adjusting device 14. This lens (3) is in a sleeve 2 that on one side has a helical thread to receive a light guide through which the pumped light radiation is coupled to the laser crystal. The side of the laser crystal (6) that faces away from laser mirror (11) has an optical coating (17) that serves as a second laser mirror and simultaneously transmits the pumped light. Both mirrors (17) and (11) are preferably designed to be highly reflecting for the basic wavelength, with coating (17) being highly transmitting for the frequency-doubled laser radiation as well. Coating (17) is also highly transmitting for the pumped light radiation and is transmitting or reflecting for the frequency-doubled laser radiation.

Openings (13a, 13b), . . . are provided in angle (1) which allow electric contacts to be fed through, for example for the Peltier element (10) or for temperature sensors that are connected with the frequency doubler or the laser crystal.

As indicated in FIG. 2, the angle can be sealed by a dust-proofing hood (18) so that no dust can penetrate the interior of the resonator. The dust-proofing hood (18) can be either provided with the sealing lips on the contact surfaces with angle (1) or it can be bent accordingly to guarantee optimal protection against dust. In order to permit the resonator elements to be adjusted even when the dust-proofing hood is closed, openings (18a), (18b), (18c) . . . can be made in the hood that match the respective adjusting screws of retaining devices (4), (9), or (16) and allow an adjusting tool to be inserted. When adjustment is complete, these openings are sealed by labels, plugs, or like.

The angle (1) that carries the resonator is machined on the bottom so that it rests exactly on three small surfaces or points on a flat surface so when it is fastened to a plate or the like, the angle is not subjected to tension.

Figure 3:
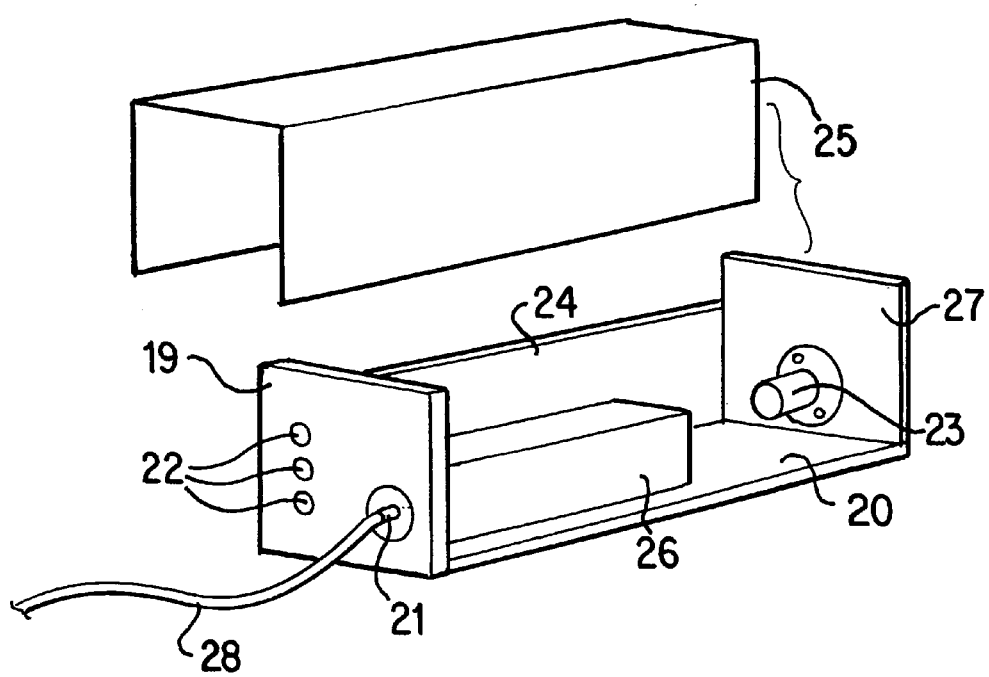
FIG. 3 shows an external laser housing with a dust-proofed resonator structure attached as a subchassis.
Figure 4:
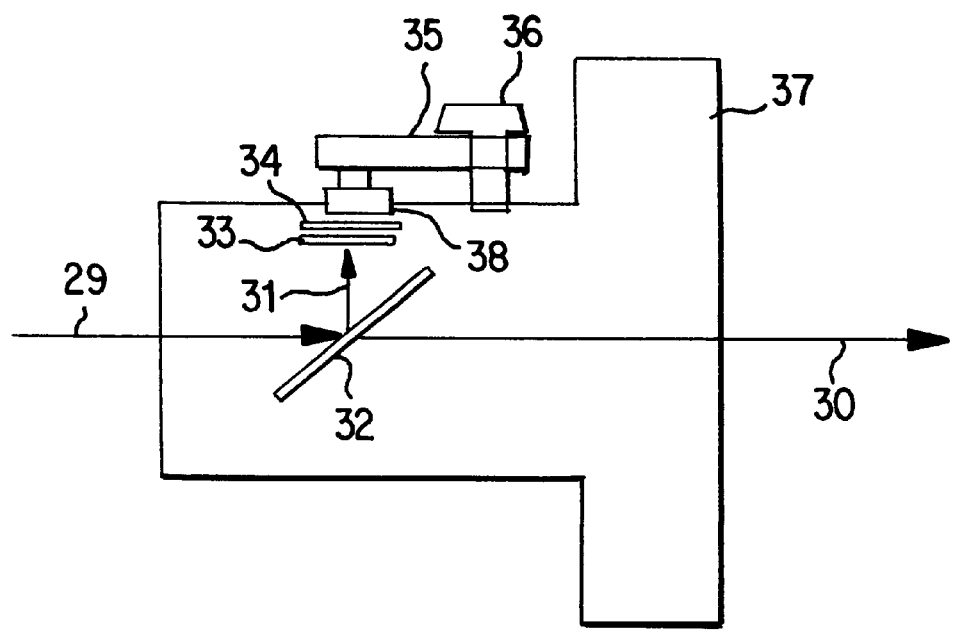
FIG. 4 is a sketch of the decoupling unit for power and noise measurement.
Figure 5:
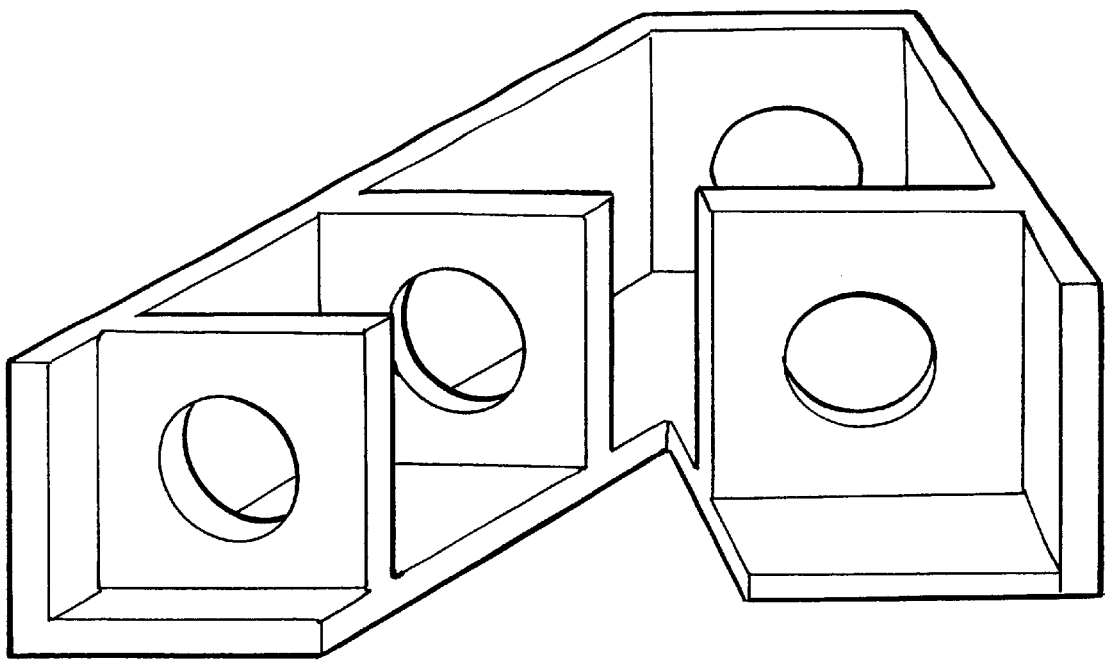
FIG. 5 is an arrangement according to the invention of a two-dimensional resonator arrangement using the example of a V-resonator.

The resonator structure (26) with this design and protected against dust, as shown in FIG. 3, is accommodated in a housing that fits over it in which, in addition to resonator (26), additional elements required for the laser such as pc boards (24) and beam diagnosis devices (23) (for example for measuring the laser power or the laser noise) are located. The housing that fits on top consists of a bottom plate (20), a front plate (27), a back plate (19), and a lid (25). All parts of the housing are preferably made of conducting material (aluminum for example) so that good shielding against electromagnetic radiation is provided for the laser and the electronics. Electrical connections (22) for the pc boards can be provided in the front or rear walls. In addition, a light guide (28) is fed through one of the walls of the housing, said guide being connected to bushing (2). In order to protect the light guide from being disassembled from outside and to guarantee a solid connection to the laser that cannot be broken from the outside, a bushing (21) is guided over the end of the light guide and screwed tightly to the housing (back plate (19) for example) so that the screw connection of the light guide itself is not accessible from outside.

In many cases, it is necessary to guide a portion of the laser radiation through a photodiode of a pc board for power stabilization, noise regulation, etc. For this purpose, in the system described, the beam diagnosis device (23) is designed as described in FIG. 4.

The laser beam emerging from resonator (26) strikes a beam splitter plate (32) which is coated so that a portion (31) of the beam is reflected but the majority (30) passes through the beam splitter plate. The coating is designed so that depending on the position of the polarization of the laser radiation, the degree of reflection can be varied by rotating the plate. The decoupled beam (31) initially strikes a filter (33) that separates the laser radiation from other radiation by wavelength selection (dielectric filter or absorption filter). Then the beam strikes a plate or film (24) that serves as a scatter disk. The disk is preferably made of ceramic or Teflon which produces especially good scattering of the beam. The scattering is necessary in order to blur inhomogeneities in the beam (31) and simultaneously to prevent fluctuations in intensity caused by a coherent effect (speckles) so that no artificial fluctuations occur at the location of the photodiode (38). The photodiode for example is mounted on a board (35) that is connected with the beam diagnosis device by a retaining screw (36). The electrical contact to the pc board (24) is made through the board and a cable.

Beam diagnosis unit (23), for precise adjustment of a defined level at the photodiode (38) on the front panel (27), is located both rotatably (because of the polarization-dependent reflection of the beam splitter plate (33)) and also displaceably in two axes perpendicular to the beam axis.

In addition to the elements described, additional elements can be accommodated in the housing that consists of (25), (20), (27), and (19) either in or outside the beam path. It is advantageous for example (for reasons of clarity not shown as in FIG. 3) to mount a lens or a lens arrangement in laser beam (29) or (30) to expand or focus a laser beam, which can be displaced perpendicularly to the optical axis in two directions in order to permit correction of the beam alignment relative to the housing and/or a plane plate that permits correction of the beam height and the lateral offset during rotation around two axes perpendicular to the optical axis. Both functions, lateral offset correction and beam alignment, can be also performed by a wedge plate located in the beam (29) or (30), which is displaceable as well as rotatable in two directions perpendicularly to the optical axis.

Finally, it should be noted that, as mentioned at the outset, in addition to the angles shown in the drawings, U profiles can also be used. It should also be pointed out that the angles or U profiles can be used not only in linear arrangements in which the structures that have a non-linear, for example a two-dimensional arrangement (for example a V or Z arrangement), but also for example in an arrangement for a V resonator as sketched in FIG. 5.

What is claimed is:

1. A diode-pumped frequency-doubled solid-state laser, wherein all elements of a resonator as well as elements inside the resonator are mounted in or on an angle or U profile milled as a solid part from an entire piece or manufactured as a cast, stamped, or sintered part from metal or ceramic, and in that said profile has one or more intermediate walls made from the same piece and mounted like the angle or U profile to lend additional stability to the profile, further wherein the resonator or resonator-internal elements are mounted in the same element and that the intermediate walls have openings to allow at least one of the laser mode and laser radiation to pass though.

2. Diode-pumped frequency-doubled solid-state laser according to claim 1 wherein a solid-state laser crystal is secured in a bushing made of aluminum, copper, steel, or ceramic, which is received in an opening of one of the intermediate walls of the angle or U profile, with the material of the bushing being chosen for its heat conducting property so that the laser crystal, when optically excited by pumped light, assumes a temperature that is favorable for operation.

3. Diode-pumped solid-state laser according to claim 2, wherein the temperature of the crystal is chosen so that the thermal lens produced by the radial temperature gradients produces a focusing of the resonator mode at the location of the frequency doubler.

4. Diode-pumped solid-state laser according to claim 1, wherein a laser crystal, on a side facing away from a frequency doubler, has an optical coating that functions as a laser mirror.

5. Diode-pumped solid-state laser according to claim 1, wherein a frequency doubler is received in a holder that permits adjustment of the crystal in the two lateral directions perpendicular to the beam path of the laser, as well as a tilting around each of these axes and a rotation around the beam axis, and is connected permanently by this holder with an intermediate wall of the angle or U profile of the resonator.

6. Diode-pumped solid-state laser according to claim 1, wherein a frequency doubler can be temperature-regulated and/or stabilized by a Peltier element.

7. Diode-pumped solid-state laser according to claim 1, wherein a decoupling mirror of the laser is received in a holder which can be displaced in two directions perpendicular to the beam axis and can be tilted around this axis and is secured by this holder with an intermediate wall or by a retaining plate with one end face of the angle or U profile.

8. Diode-pumped solid-state laser according to claim 1, wherein the angle or U profile supporting the resonator is machined on its underside so that it rests at only three points on a flat surface.

9. Diode-pumped solid-state laser according to claim 1, wherein the angle or U profile is provided with a hood that seals off the angle or U profile with the respective holders for the optical elements in such fashion that no dust can penetrate the enclosed interior of the resonator, with the hood being provided with bends or sealing lips on the respective boundary surfaces for sealing.

10. Diode-pumped solid-state laser according to claim 9 wherein the hood is provided with holes that permit a suitable tool to be inserted to change the positions of the optical elements by the adjusting devices, with the holes being sealed for normal operation by suitable covers.

11. Diode-pumped solid-state laser according to claim 1, wherein the resonator structure composed of the angle or U profile with all of the adjusting and retaining devices and optical elements as well as a dust-proofing hood is bolted or connected as a subchassis in a larger housing, said housing representing an enclosed upper housing and receiving in addition to the resonator structure, additional elements of the laser system, including at least one pc board for regulating and controlling the laser as well as elements for diagnosing laser radiation.

12. Diode-pumped solid-state laser according to claim 11, wherein the outer housing of the laser consists of a conducting material and that good shielding against external electromagnetic radiation is provided for the laser and the electronic elements in the laser.

13. Diode-pumped solid-state laser according to claim 1, wherein openings are machined in the angle or U profile, through which openings electrical element such as Peltier elements for temperature control or temperature sensors can be connected in the laser housing with an electronic unit contained there.

14. Diode-pumped solid-state laser according to claim 1, wherein a portion of the laser radiation is conducted through at least one beam splitter plate to a photodiode which is connected with an electronic unit contained in a housing and thus permits detection of power, power fluctuations, or amplitude noise.

15. Diode-pumped solid-state laser according to claim 14 wherein the photodiode has a bandwidth of least 1 MHz.

16. Diode-pumped solid-state laser according to claim 14. wherein the beam splitter plate is coated so that the reflection is polarization-dependent and so the amount of decoupled light can be adjusted depending on the angle to the polarization of the laser radiation.

17. Diode-pumped solid-state laser according to claim 1, wherein a decoupling unit is mounted displaceably in two directions perpendicular to the optical axis, so that it can be adjusted in the laser beam and mounted rotatably so that the amount of decoupled light can be adjusted by rotating a beam splitter plate contained in it.

18. Diode-pumped solid-state laser according to claim 1, wherein filters are mounted in front of a photodiode for selecting the laser radiation from the rest of the light radiation and, in addition, further wherein a scatter disk made of a diffuse material that attenuates the light radiation and as a result of the scatter, blurs the intensity distribution over the beam cross section is mounted in front of the photodiode so that no fluctuations in the spatial beam profile or fluctuations in intensity that also occur due to coherent effects falsify the photodiode signals.

19. Diode-pumped solid-state laser according to claim 1, wherein a device is mounted to receive optical elements on a beam outlet side, on the angle or U profile of the resonator or on an outlet side of a laser subchassis or of a surrounding laser housing.

20. Diode-pumped solid-state laser according to claim 1, wherein a lens is provided in an emerging laser beam to expand or focus the laser beam and/or a lens or lens arrangement adjustable in two directions perpendicular to the beam axis to change the exit angle of the laser radiation relative to the housing walls.

21. Diode-pumped solid-state laser according to claim 1, wherein a flat plate is accommodated in an emerging laser beam for correcting beam height and lateral offset of the laser beam relative to housing walls, said plate being capable of being tilted around the two axes that are perpendicular to the beam axis.

22. Diode-pumped solid-state laser according to claim 1, wherein a wedge plate is accommodated in an emerging laser beam for correction of both an exit angle and a beam position of the laser radiation, said plate being capable of being tilted around two axes perpendicular to the beam axis and also capable of being displaced around two axes perpendicularly to the beam axis.

23. Diode-pumped solid-state laser according to claim 1, wherein pumping light from a laser diode for optical excitation of a laser crystal guided to the laser crystal through a light guide and the radiation emerging from this light guide is focused by a lens on the laser crystal, with the light guide being connected by a screw device with the resonator unit and which is secured by a top-mounted sleeve tightly screwed to a laser housing so that the light guide cannot be removed from outside without removing the sleeve.

24. Diode-pumped solid-state laser according to claim 1, wherein a lens for focusing pumped light radiation can be displaced by a suitable adjusting device in two directions perpendicularly to the beam axis and can also be tilted around two axes perpendicularly to the beam axis, with an additional adjustment of the displacement in the direction of the beam axis also being possible.

25. Diode-pumped solid-state laser according to claim 24 wherein a light-guide fiber is tightly screwed to a bushing that holds the lens and thus is displaced and tilted together with the lens.

26. Diode-pumped solid-state laser according to claim 1, wherein a bushing together with a lens and a light guide are permanently connected with the angle or U profile by an adjusting device with a retaining plate or other intermediate wall of the angle or U profile.

* * * * *